(No Model.) 4 Sheets—Sheet 2.
S. M. COFFMAN.
CAR COUPLING.
No. 489,894. Patented Jan. 10, 1893.
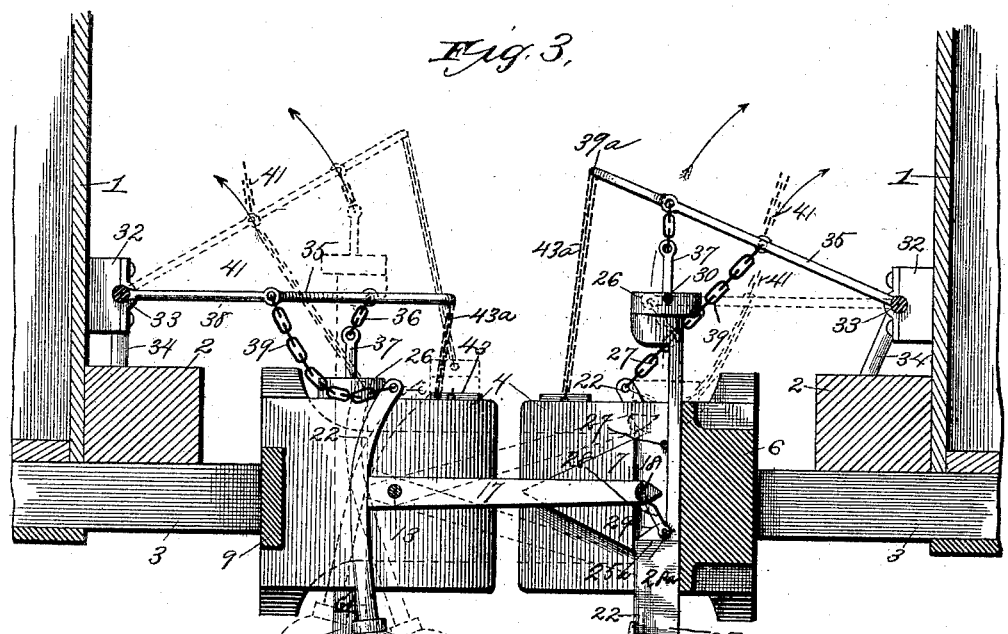
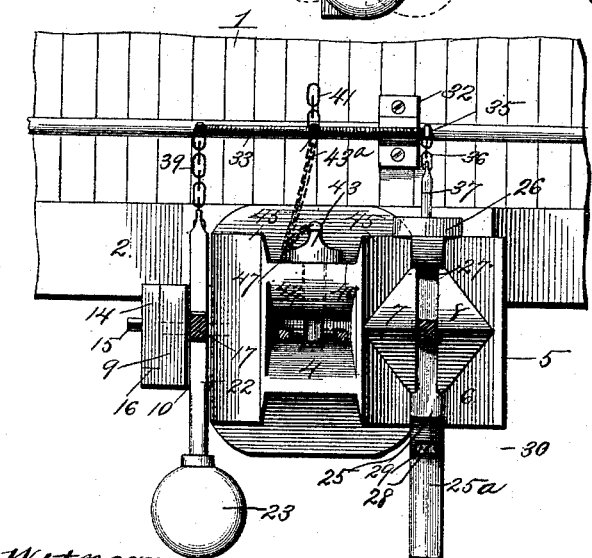
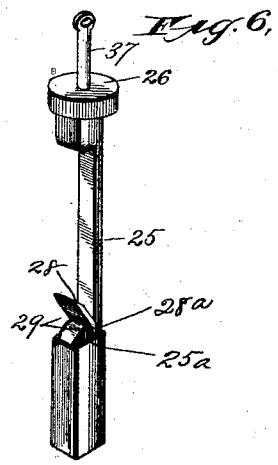
Witnesses,
Inventor:
S. M. Coffman,
By Hyden & Hyden
Atty's (No Model.) 4 Sheets—Sheet 3.
S. M. COFFMAN.
CAR COUPLING.
No. 489,894. Patented Jan. 10, 1893.
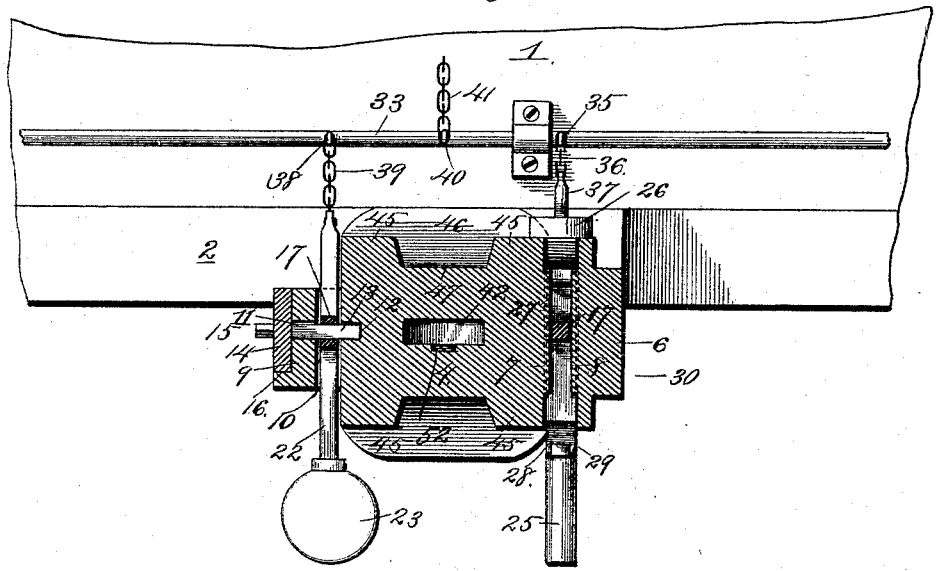
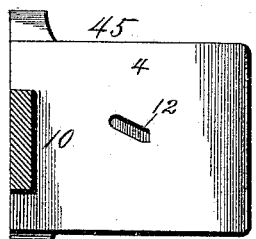
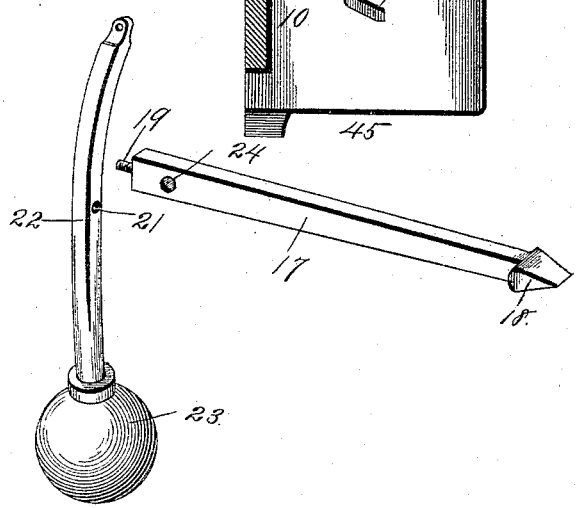
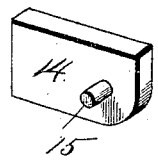
Witnesses:
G. W. Thorpe.
Jno. L. Condron
Inventor:
S. M. Coffman
By, Hyman & Hyman
Attys.

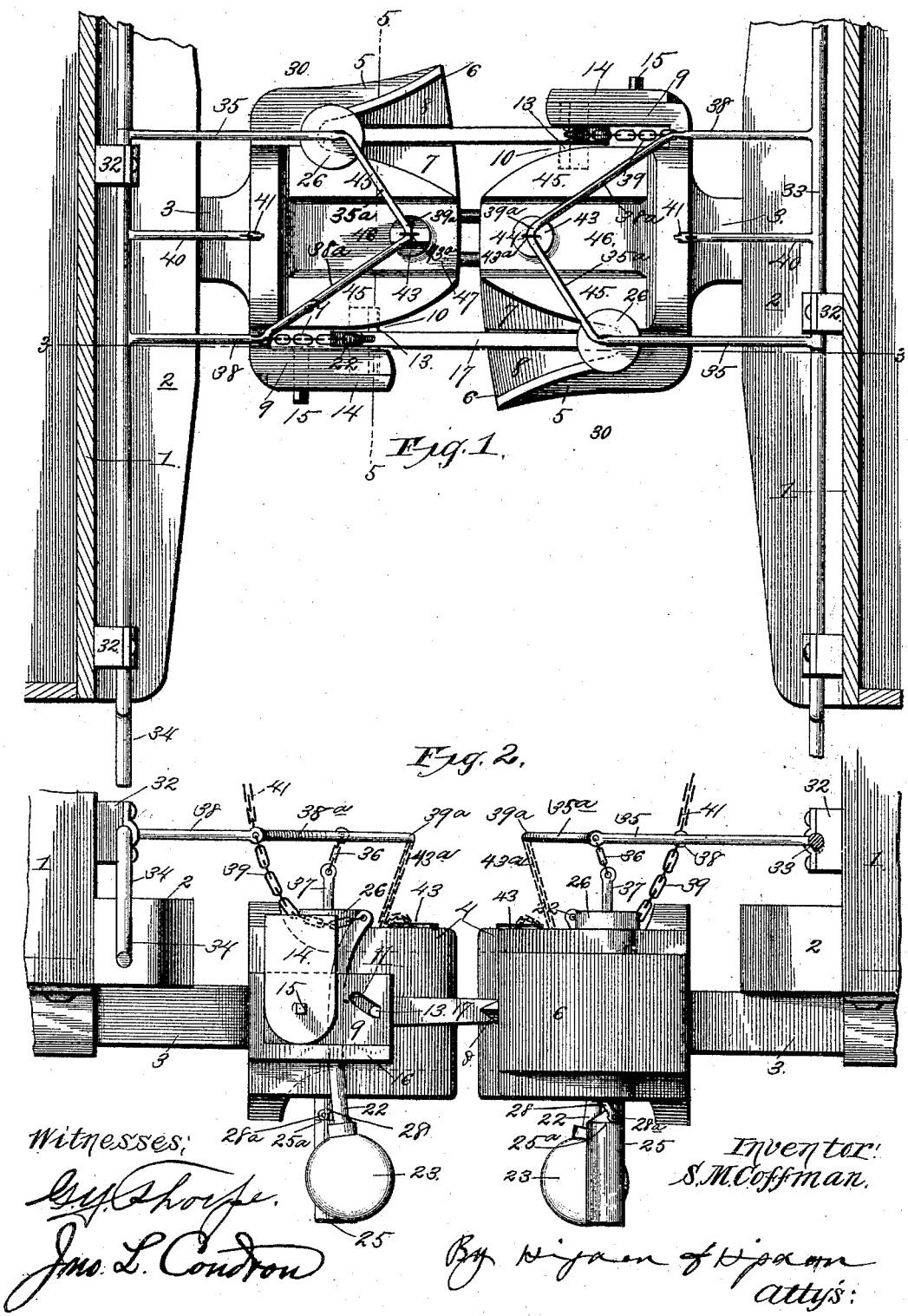

(No Model.) 4 Sheets—Sheet 4.

S. M. COFFMAN.
CAR COUPLING.

No. 489,894. Patented Jan. 10, 1893.

Witnesses:
Inventor:
S. M. Coffman.
By Hipman & Hipman
Atty's.

UNITED STATES PATENT OFFICE.

SAMUEL M. COFFMAN, OF BRAYMER, ASSIGNOR OF ONE-HALF TO MARTIN COFFMAN, OF GEORGEVILLE, MISSOURI.

CAR-COUPLING.

SPECIFICATION forming part of Letters Patent No. 489,894, dated January 10, 1893.

Application filed October 8, 1892. Serial No. 448,177. (No model.)

*To all whom it may concern:*

Be it known that I, SAMUEL M. COFFMAN, of Braymer, Caldwell county, Missouri, have invented certain new and useful Improvements in Automatic Car-Couplings, of which the following is a full, clear, and exact description, reference being had to the accompanying drawings, forming a part of this specification.

My invention relates to automatic couplings for freight cars, passenger cars, and various other types of railway vehicles, and the objects of my invention are to produce a coupling which shall be simple, strong, durable, and inexpensive in construction; capable of application to all of the various types of cars and other vehicles without necessitating any material alteration of the vehicles, also capable of coupling high and low cars, and of operating in connection with cars having the usual link and pin couplings. Also to produce a coupling which, in addition to the advantages above mentioned, shall be entirely automatic in its coupling action, and which shall entirely avoid the necessity of the operator's going between the cars while coupling and uncoupling the same.

To the above purpose, my invention consists in certain peculiar and novel features of construction and arrangement, as hereinafter described and claimed.

In order that my invention may be fully understood, I will proceed to describe it, with reference to the accompanying drawings, in which,—

Figure 11:
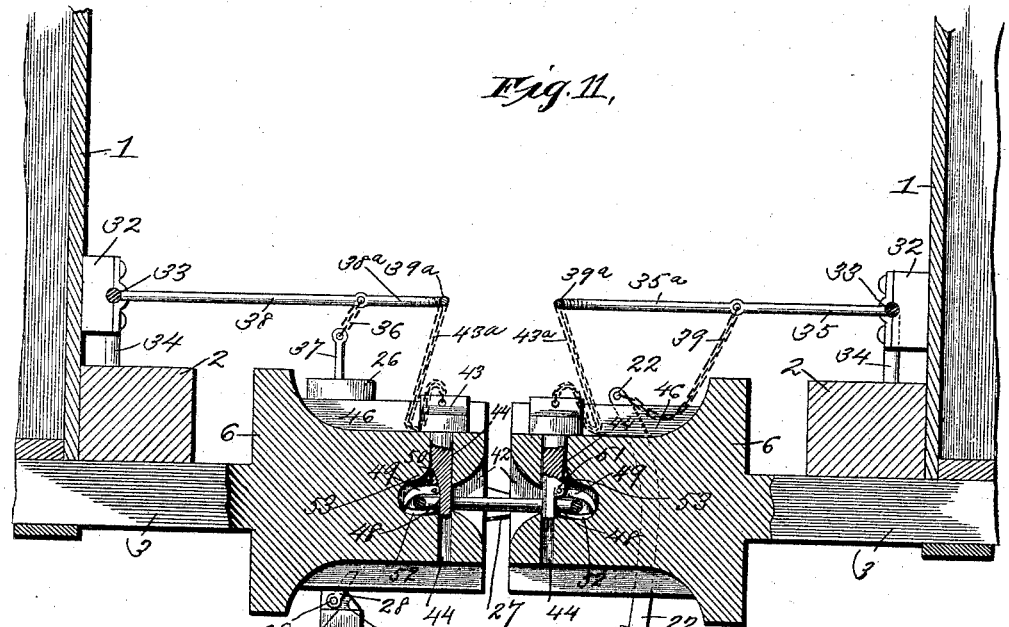
Figure 12:
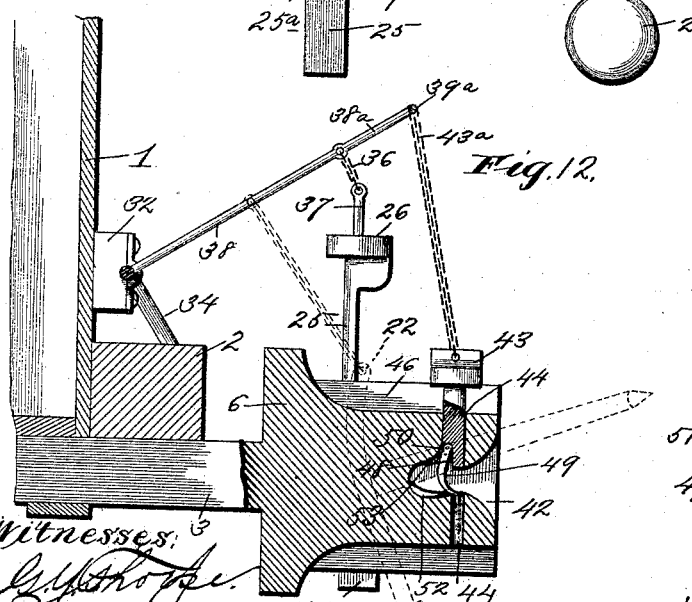
Figure 13:
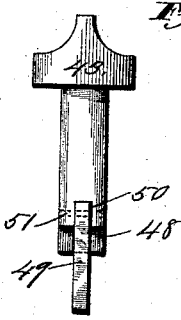

Figure 1. is a plan view of the adjacent ends of two cars with my improved couplings applied thereto. Fig. 2. is a side elevation of the same. Fig. 3. is a vertical longitudinal section of the same, on the line 3—3 of Fig. 1. Fig. 4. is an end elevation of a part of a car with one of my improved couplings applied thereto. Fig. 5. is a transverse vertical section of the same, on the line 5—5 of Fig. 1. Fig. 6. is a detached perspective view of the vertically movable serrated lifting bar. Fig. 7. comprises detached perspective views of the two principal parts of one of the pivotal gravity coupling bars. Fig. 8. is a detached perspective view of one of the pivotal retaining plates for the pivot pin of the gravity coupling bars. Fig. 9. is a detached perspective view of one of the removable pivot-pins of the gravity coupling bars. Fig. 10. is a vertical longitudinal section of one of the coupling heads. Fig. 11. is a central longitudinal section of two meeting coupling heads in their locked relation. Fig. 12. is a central longitudinal section at the rear of a coupling head showing the coupling pin elevated. Fig. 13. is a detail view of the coupling pin.

In the said drawings, 1 designates two railway cars, the said cars being either passenger cars or freight cars, and if the latter, said cars being either box-cars, cattle cars, refrigerator or flat cars, or any other suitable or preferred type of freight cars.

It is to be understood that the invention is particularly designed for application to all kinds of freight cars, but that it is equally applicable to passenger cars, locomotives, and all other kinds of railway vehicles which employ couplings so as to be arranged in trains. As shown in the drawings, however, the cars, 1, are of the usual box type, and are also shown as provided at their ends with transverse buffer-platforms 2.

3 designates the draw bars, which are mounted beneath the ends of the car bodies in the usual or any preferred manner, and which are of the usual or any preferred form or type.

Upon the outer end of each draw-bar 3 is formed, or suitably secured, the coupling head, 4. Each of these coupling heads is in the form of a solid metal casting of proper size and strength, and the central body or portion of the coupling head is tapered forward and convergently toward its outer end, as shown. At one side of each of these coupling heads 4 is formed an extension which is integral with the body portion of the coupling head, and which projects obliquely forward and outward from the rear portion of the side of the body portion, so as to form a rearwardly tapered vertical jaw, 6. The outer corresponding side of the body portion of the draw head is formed with a projection, 7, which is of triangular form, as is best shown in Fig. 3; the apex of the projection being at its forward end, and the base of said projection forming its rear end. Thus two oblique sides or surfaces are formed by the projection, 7, the upper surface inclining rearwardly and upwardly, and the lower surface inclining rearwardly and downwardly, as shown. The length, or depth, of the projection 7, from its front to its rear, is such that the rear end, or base, of the projection (which forms a vertical surface) is separated by a considerable distance from the front surface of the rear wall of the jaw, 6. The inner surface of the extension, 5, is formed with a projection, 8, corresponding precisely in form with the projection 7 just described, and exactly oppositely disposed relatively to said projection 7. The width of the projections 7 and 8 is so much less than the total width of the corresponding parts of the jaw 6 that a vertical space or interval is formed between the adjacent sides of the two projections, for a purpose to be hereinafter explained.

It is to be understood that each of the draw heads 4 is formed with the forward extension 6 and projections 7 and 8, and that, furthermore, the extension 5 of one draw head is located at the opposite side of said draw head from the extension 5 of the companion, or opposite, draw head.

Upon the opposite side of each coupling head 4 from that occupied by the extension 5, is formed a second extension, 9, the said extension projecting forwardly parallel with the corresponding side of the body portion of the coupling head, and being integrally united at its rear end to the said head; thus forming a second recess, or cavity, 10, in this side of the coupling head. It is to be understood that the recess, or cavity, 10 of one head is located at the opposite side of said head from the recess, or cavity, 10 of the opposite or companion coupling head.

In each extension 9, at a point near its forward end, is formed a slot, 11, which inclines forwardly and downwardly from its rear end to its front end, and the front end of which is preferably formed angular, as shown. Upon the corresponding outer side of the body portion of the draw head, at a point precisely opposite from the slot 11, is formed a recess, 12, which corresponds precisely in form with the slot 11, and which also extends downward and forward, similarly to the said slot. In this slot 11 and recess 12, works a removable pivot-pin 13, which is preferably formed angular upon the front and lower sides of its extremities, to register with the angular front ends of the slot and recess, for a purpose hereinafter described.

In order to prevent the pivot pins 13 from being accidentally misplaced from the slots and recesses, a retaining plate, 14, is pivotally secured to the outer side of each extension 9; the pivot 15 of each plate passing transversely through the rear end of the plate and into the corresponding part of the extension. When in horizontal position, the plate 14 rests upon a horizontal shoulder which is formed upon the outer side of the extension 9, and said plate closes the slot 11 and extends past the outer extremity of the pin 13, and thus prevents the pin from being jolted out of position. When the pin 13 is to be removed, the plate 14 is lifted at its front end (the rear end of the plate being rounded off, as shown, for this purpose) and the outer end of the pin is exposed, and may be grasped and withdrawn from the slot and recess. Each of the pivot pins 13 constitutes the support for a pivotal coupling bar, there being thus two of said bars, one for each coupling head. Each of these coupling bars consists of an elongated bar 17, the front end of which is formed, or otherwise provided with, an arrow shaped head 18 extending horizontally from the bar, and the rear end of each bar 17 is formed with a reduced and externally screw threaded rearwardly extending portion, 19. This externally screw threaded portion, 19, enters an internally screw threaded socket, 20, which is formed in the front side of a segmental cross bar, 22. This cross bar 22 is provided at its lower end with a counter weight 23, of spherical, or other suitable form, and which is either formed integrally with the lower end of the cross bar 22, or detached therefrom, as preferred. Each of the pivot pins 13 before described extends through an opening 24 which is formed transversely through the rear end of the bar 17, as shown.

In the vertical passage through the extension 5 of the draw head, and immediately in rear of the vertical walls formed at the rear side of projections 7 and 8, is located a vertically movable bar 25, the lower, or body, portion of which is rectangular in cross section, and the upper part of which is formed, or provided with, a disk shaped head, 26. The said bar 25 is reduced, or cut away, at its front surface, from a slight distance below the disk head 26 to within a suitable distance of the lower rectangular end, which is enlarged laterally at 25$^a$. The upper end of the rectangular portion of the bar is beveled upwardly and rearwardly at 29 to the front side of the reduced portion of the bar, and forms a cam, or stop surface, to prevent the lifting arm, 28, which has two rearwardly extending arms, pivoted at their rear ends at 28$^a$ to the side of the reduced portion of bar 25, from falling below a certain position. The opposite sides of the lifting arm 28 are in alignment or flush with the outer sides 25$^a$ of the enlarged end of the bar 25.

Upon each end of each car body, 1, is journaled, in suitable bearings 32, secured to the car body, a horizontal rock shaft, 33, which extends horizontally across the car body, and which at each end is provided with a crank arm 34, which crank arms project beyond the sides of the car body. Each of these rock shafts is provided, or formed, with a skeleton frame, comprising the parallel and forwardly extending arms 35$^a$ and 38$^a$, which extend inwardly and forwardly to a meeting point, 39ª, vertically above the coupling pin, 43.

Attached to the frame at the junction of the arms 35 and 35ª, is the upper end of a chain, 36, or other suitable flexible connection, the lower end of which is secured to the upper end of a rod 37, extending vertically upward from the upper side of the disk shaped head, 26, of the corresponding bar 25. At the junction of the arms 38 and 38ª of the frame, is also attached the upper end of a chain or other flexible connection, 39, the lower end of which connects with the upper end of the cross bar 22. A chain, 43ª, also connects the coupling pin, 43, with the apex of the angle formed by the junction of the arms 35ª and 38ª. A rock arm, 40, interposed between the arms 35 and 38, is also carried by the rock shaft 33, and to the outer end of this rock arm 40 is connected a chain, 41, or other suitable flexible connection, which leads to the top of the car.

In order to adapt the couplings to be used in connection with the usual pin and link couplings, an orifice, 42, with the usual divergent guide walls, is provided in the front end of the body portion of the drawhead, and the vertical channels, 44, for the reception of the coupling pin, 43, are made through the upper and lower jaws of the same.

Two parallel ribs, 45, extend longitudinally of the top of the draw head 4, and thus inclose laterally a cavity, 46, in which the usual link, 47, can lie safely when not in use, and in readiness for use whenever required.

The coupling pin 43, and the interior of the draw head, are of peculiar construction, which I will proceed to describe.

Referring to Figs. 11, 12 and 13, it will be seen that the lower end of pin 43 is cut away, or recessed, at 48, and that the upper end of a pawl, or dog, 49, is pivoted in a notch, 50, formed in shoulder 51, of the rear side of the pin, and that when the cars are uncoupled, as shown in Fig. 12, the lower end of the pawl, or dog, which curves slightly downward and outward, rests in the upper end of the lower channel, or pin hole, and the convex rear surface of the pin rests upon the rear edge of the pin hole, and thus supports the pin in its elevated position. The lower end of the pawl, or dog, 49, projecting into the pin hole, prevents the accidental displacement thereof, and therefore the descent of the pin. A recess, or channel 52, extending from the rear edge of the lower pin hole, to the rear end of the orifice, is formed in the upper surface of the lower jaw of the draw head, to allow the pawl, or dog, when the link of the companion draw head strikes it, to swing rearwardly to the position shown in Fig. 11, and force the pin to descend, the lower end entering the upper end of the lower pin hole, and locking the link in position. The rock shaft, 33, is operated, and as the pin is raised the shoulder 53, in rear of the pin hole and of the upper jaw of the draw head causes the pawl, or dog, to swing down into position to support the pin in its elevated position.

The operation of the above described coupling is as follows:—Normally the rock shafts 33 are in such position that their crank arms are pendent, and their rock frame is horizontal. When the two cars are to be coupled together, the one car is moved toward the other, and according as one of the coupling heads is higher or lower than the other, the heads 18 of the coupling bars 17 engage the upper or lower surfaces of the projections 7 and 8, as the case may be, tilting the cross bars 22 out of pendent perpendicular position, as indicated in dotted lines in Fig. 3, the movement of the cross bars being either forward or rearward, according as the heads 18 ride over the upper or lower surfaces of the projections 7 and 8. As soon as the heads 18 have passed the projections 7 and 8, the counter weights 23 automatically return the coupling bars 17 to their normal horizontal positions in the spaces behind the projections 7 and 8. Simultaneously with the coupling described, the second, or intermediate coupling is made, by the link of the approaching car entering the mouth of the draw head and forcing the supporting pawl, or dog, rearwardly, and forcing the pin to descend and couple the drawheads together. When it is desired to uncouple the cars the operator grasps one of the crank arms 34, or the upper end of the flexible connection 41, according as he is on the ground or upon the top of the car, and rocks the shaft 33 in such manner as to raise the rock frame. As the rock frame rises it lifts the bar 25 vertically, and the lifting arm 28, engaging the head 18 of the corresponding coupling bar, 17, lifts said head 18 out of the passage back of the projections 7 and 8, so as to free the head 18 from said projections. The upward movement of the bar is here limited by the horizontal cross pin, 27, to prevent the accidental withdrawal of the bar from the passage. It will be seen that the flexible connections between the rock frames and the cross bars 22 and coupling pins 43 are considerably longer than the connections between the rock frames and the bars 25; consequently, after the bar 25 has been almost fully elevated by the movement of the rock shaft 33, the rock frame moves the cross bar 22 backward, lifting the head 18 of the corresponding bar 25 of the opposite coupling, and also simultaneously raises its own coupling pin 43 to its uncoupled position. The cars, being now moved away from each other, will readily uncouple. It will be seen that both couplings are uncoupled by rocking the rock shaft 33 of either coupling, as just described. In case a car having the common link and pin coupling is to be connected to a car provided with my improved coupling, a portion, only, of the automatic mechanism is used; the link 47 is taken out of its cavity 46, and, the pin 43 being raised, said link is inserted into the orifice 42, and retained therein by the pin, 43. As the cars are brought together, the link 47 enters into the jaw of the common coupling of the opposite car, and is secured by the pin of said coupling in the usual manner.

A peculiar and valuable feature of my improved coupling is that each portion of the coupling is automatically operative, independent of the other, which, in case of the breakage or damage to one or the other of these parts, allows the use of the other.

Another peculiar and valuable feature of my central, or intermediate coupler is the automatic release and expulsion of a link from a drawhead when desired. For example, should one of my improved couplers approach an ordinary pin and link coupler, each drawhead carrying a link in position, by operating the crank shaft 33, from the top of the car or from the ground, the pin would be lifted, and the wall in rear of the pin would cause the pawl, or dog, to push, or force, the link out of the drawhead instantly, as will be understood, reference being had to Fig. 11.

From the above description, it will be seen that I have produced an automatic car coupling which is simple, strong, durable, and inexpensive in construction, and rapid and effective in its operation. Furthermore, that I have produced an automatic car coupling which can be applied to all types of railway cars and other railway vehicles requiring couplings, and that the application of my improved coupling requires no material alteration in the construction of the cars or other vehicles. It will also be seen that I have produced an automatic car coupling which operates with equal effectiveness in coupling and uncoupling both high and low cars, and which entirely avoids all necessity of the operator's entering between the cars while coupling and uncoupling the same, thus avoiding all danger to life and limb from so entering between the cars.

Having thus described my invention, what I claim as new therein and desire to secure by Letters Patent, is:—

1. An automatic car coupling, comprising a coupling head having at one side an obliquely forward and outward projecting extension, and provided also with two triangular projections located upon the adjacent sides of the head and of the extension; said projections being separated from each other, substantially as described.

2. An automatic car coupling, comprising a cavity or recess located at one side of the coupling head, and a triangular projection located within the cavity or recess; the upper and lower sides of the projection extending respectively obliquely rearward and upward, and rearward and downward, substantially as described.

3. An automatic car coupling, comprising a recess or cavity located at one side of the coupling head, and a vertically moving bar located in said recess and provided with a lifting arm, substantially as set forth.

4. In an automatic car coupling, a bar designed to operate vertically in a coupling head, and provided with a reduced portion, and also provided at its upper end with a head, and at its lower end with an enlarged rectangular portion having an inclined shoulder or cam face at its point of juncture with the reduced portion; said bar being also provided with a pivotal lifting arm to engage the side of the coupling head, substantially as set forth.

5. An automatic car coupling, comprising a coupling head provided at one side with a recess, or cavity, a recess formed in the inner wall of said cavity and extending obliquely downward and forward, a slot in the outer wall of the cavity and also extending obliquely downward and forward, and a pivoted retaining plate mounted upon the outer side of the outer wall of the cavity and arranged to close the outer side of the slot, substantially as set forth.

6. An automatic car coupling, comprising a coupling head having a cavity, or recess, at one of its sides, a recess formed in the inner wall of said cavity and extending obliquely downward and forward, a slot formed in the outer wall of the cavity, and also extending obliquely downward and forward, a pivot pin mounted removably in said oblique recess and slot, a gravity coupling bar pivoted upon said pin, and a pivot retaining plate mounted upon the outer side of the outer wall of the cavity, and resting when in closed position upon a ledge formed upon said wall, and closing the outer side of the slot, substantially as described.

7. An automatic car coupling, comprising a coupling head provided at its outer end with a link cavity, and a vertical opening for a pin extending transversely through the cavity, and also provided upon its top with a longitudinal cavity for the link, substantially as described.

8. An automatic car coupling, comprising a coupling head having at each side a cavity or recess, a vertically movable bar located in one of said cavities, and having a lifting arm upon its outer side, a gravity coupling bar pivoted in the opposite recess and having a pendent cross bar, a rock shaft journaled upon the end of the car body and having a crank handle at each end, and provided also with a rock frame, flexible connections from said rock frame to the vertical bar and to the pivoted coupling bar and to the coupling pin, and also from one of said rock arms to the top of the car body, substantially as described.

9. An automatic car coupling, comprising a coupling head having at each side a cavity, or recess, and at its forward end an orifice, a vertically movable bar located in one of said cavities, a gravity coupling bar located in the opposite recess, the vertically aligned channels, or pin holes, communicating with the orifice, and a pin adapted to rest in said channels or pin holes, a rock shaft journaled upon the car body and having a crank handle at each end, and a forwardly projecting rock frame, and a rock arm connected to the top of the car, and flexible connections between the rock frame and the vertical bar, the coupling bar, and to the coupling pin, substantially as described.

10. An automatic car coupling, comprising a coupling head having an orifice in the front, vertically aligned and extending channels, or pin holes, a pin adapted to engage said channels, or pin holes, having a pendent pawl, or dog, pivoted in the rear lower end thereof, and a recess in the upper side of the lower jaw and in rear of the pin hole, and a shoulder in the inner side of the upper jaw, and also in rear of the pin hole, substantially as described.

11. An improved coupling pin, having a shoulder in the rear and a slight distance from the end thereof, and a pawl, or dog, having a down and out curved end pivoted at its upper end in a recess formed in said shoulder, substantially as described.

In testimony whereof I affix my signature in the presence of two witnesses.

SAMUEL M. COFFMAN.

Witnesses:
H. H. HAYS,
W. T. WILLIAMS.